Oct. 23, 1934.  S. HEINTZ  1,978,048
METHOD OF MAKING COMPOSITE ARTICLES
Filed Aug. 15, 1932
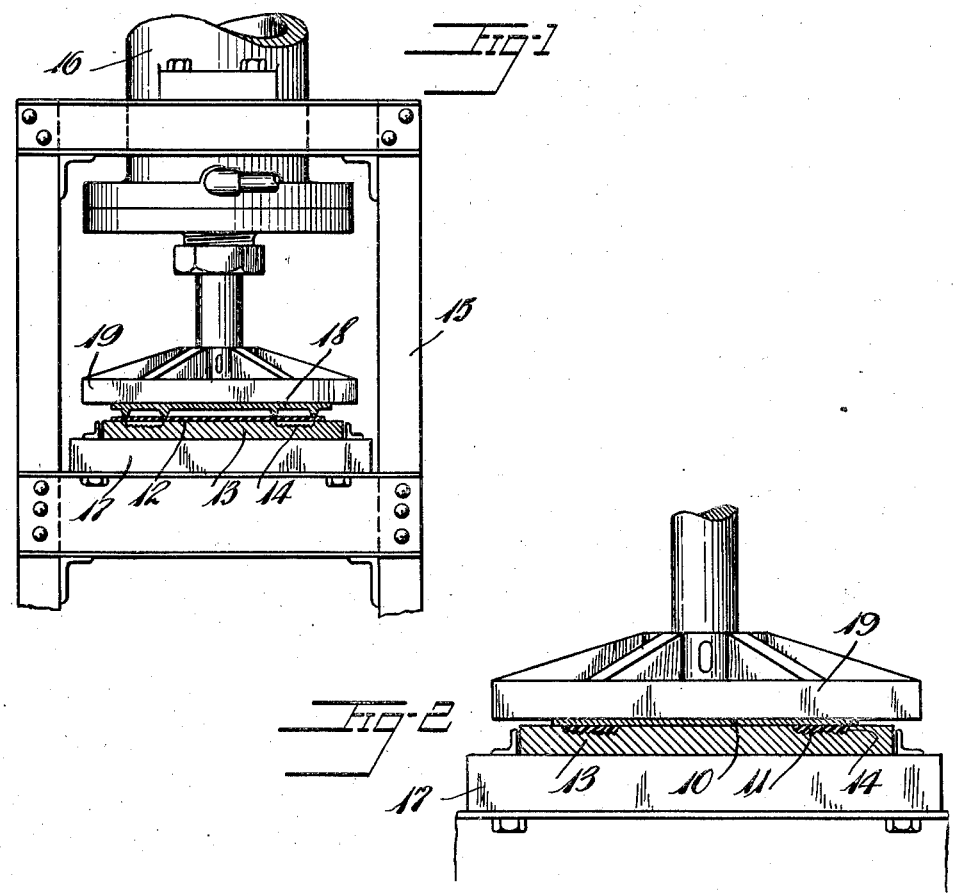
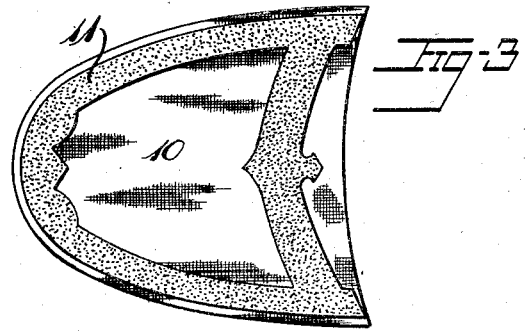
Inventor
Samuel Heintz
By Eakin & Avery
Attys.

Patented Oct. 23, 1934

1,978,048

UNITED STATES PATENT OFFICE 1,978,048

METHOD OF MAKING COMPOSITE ARTICLES

Samuel Heintz, Watertown, Mass., assignor, by mesne assignments, to Hood Rubber Company, Inc., Wilmington, Del., a corporation of Delaware Application August 15, 1932, Serial No. 628,799

2 Claims. (Cl. 18—59)

This invention relates to the manufacture of composite articles, especially footwear comprising fabric or other sheet material having one or more deposits of plastic material, such as rubber composition, adhered to the sheet material over determinately limited areas thereof for such purposes as reinforcement and ornamentation.

The chief objects of this invention are to provide improved procedure for producing such composite articles, to provide conveniently for molding the plastic deposits in adhesive engagement with the sheet backing, to provide apparatus for conveniently carrying out the procedure, and to provide a product of attractive appearance and durable construction.

These and further objects will be apparent from the following description, reference being had to the drawing, in which:

Fig. 1 is an elevation, with parts broken away and in section, of apparatus for cutting the sheet plastic material in accordance with the invention in its preferred form.

Fig. 2 is an elevation, with parts broken away and in section of apparatus for molding the cut plastic material and pressing it into engagement with a sheet backing in accordance with the invention.

Fig. 3 is a plan view of the fore part of a shoe upper made according to the invention.

Although the field of utility is not so limited, the invention is especially useful in the manufacture of such composite articles as footwear of the type in which an upper component of fabric or other sheet material has limited areas thereof coated with a plastic material.

A composite article constructed according to the invention is shown in Fig. 3 of the drawing, in which 10 is a component or blank of fabric or other sheet material shaped for use as the fore part of a footwear upper, and 11 is a deposit of plastic material covering a determinately limited area of the sheet backing 10, the deposit 11 being molded in adhesion with the backing 10 to provide an integral structure and a surface reinforcement or ornamentation of the desired attractive appearance and graduated thickness.

According to the preferred procedure for producing this article, a sheet of plastic material, shown at 12 in the drawing, preferably rubber composition, is superimposed upon a plate member 13 having in its face one or more mold recesses 14 of the proper configuration to produce a deposit or deposits of the desired form. The sheet plastic material is then cut or otherwise separated along the margin of the mold recess and the surplus material is removed leaving a strip of the material overlying the recess in an amount, determined by the thickness of the sheet, sufficient substantially to fill the recess.

The fabric or other sheet 10, preferably cut to the desired final shape, is then placed upon the plastic material that overlies the recess, and is pressed into adhesive engagement with the plastic material, the latter at the same time being pressed against the walls of the mold recess and accordingly molded to shape. If desired, cementitious material may be incorporated between the backing and the plastic deposit, although this is not essential in all cases.

The article may be vulcanized, or partly vulcanized, before it is removed from the mold, though in the case where the article is a footwear component final vulcanization is preferably deferred until after assembly of the component in the article of footwear.

Both the cutting of the plastic material and the pressing on of the fabric may be accomplished by means of a press 15, operated as by a fluid pressure cylinder 16, the mold member 13 being positioned on the lower press platen 17. For the cutting operation various expedients may be employed but preferably a die cutter 18 of suitable shape is associated with the upper platen 19 with the cutting edges disposed to cut through the sheet 12 while the latter rests upon the plate member 13 or to cut sufficiently deep into the sheet to permit ready separation, along the margin of the recess. Upon separation of the press platens, the surplus plastic material is removed and the backing 10 of the article superimposed upon the remaining material. The margin of the cut material and the margin of the mold recess serve as guides for facilitating the proper positioning of the sheet backing.

For pressing the backing 10 into adhesive engagement with the plastic material in the mold cavity the die cutter 18 may be removed from the upper press platen, or a second press may be used, to provide the desired pressing surface, and for effective pressing in cases where the plastic material does not completely fill the recess the upper platen face may be padded or provided with protuberances of the proper shape to press the fabric against the plastic material without hinderance by the highest portions of the mold face.

Undesirable depositing of the plastic material upon the fabric outside of the recess is avoided due to the materials having been cut and positioned substantially in coincidence with the outline of the recess.

The procedure and apparatus have the advantages incident to the convenient manipulation of the stock originally in simple sheet form, and at the same time the advantages are present of providing a molded article in which the deposits are neatly formed and securely bonded to the sheet backing.

Variations may be resorted to without departing from the scope of the invention as it is defined in the following claims.

I claim:

1. The method of making a composite article which comprises superimposing sheet plastic material upon a surface having a mold recess of determinate configuration, separating the sheet material at the margin of the recess, removing a separated portion of the material and leaving the material lying in registry with the recess but not in final molded disposition therein, superimposing thereupon a sheet backing and pressing it into adhesive engagement with the plastic material and at the same time pressing the material against the walls of the recess to mold the same, and removing the backing with the plastic material adhered thereto.

2. The method of making footwear which comprises superimposing plastic sheet rubber composition upon a surface having a recess of determinate configuration, separating the sheet rubber at the margin of the recess, removing a separated portion of the rubber and leaving the rubber lying in registry with the recess, but not in final molded disposition therein, superimposing upon the latter a fabric component for a footwear upper, pressing the fabric into adhesive engagement with the rubber and at the same time pressing the rubber against the recessed portion of the surface to mold the rubber to a form wholly confined between the fabric and the recess walls, and removing the fabric with the rubber adhered thereto and with the fabric exposed at the margin of the rubber.

SAMUEL HEINTZ.